(12) United States Patent
Kim et al.

(10) Patent No.: US 8,741,470 B2
(45) Date of Patent: Jun. 3, 2014

(54) ELECTROCHEMICAL DEVICE HAVING DIFFERENT KINDS OF SEPARATORS

(75) Inventors: Jong-Hun Kim, Daejeon (KR); Hyun-Min Jang, Daejeon (KR); Jang-Hyuk Hong, Daejeon (KR); Joon-Yong Sohn, Daejeon (KR); Sang-Young Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 578 days.

(21) Appl. No.: 12/093,404

(22) PCT Filed: Apr. 22, 2008

(86) PCT No.: PCT/KR2008/002252
§ 371 (c)(1),
(2), (4) Date: May 12, 2008

(87) PCT Pub. No.: WO2008/130175
PCT Pub. Date: Oct. 30, 2008

(65) Prior Publication Data
US 2010/0261047 A1    Oct. 14, 2010

(30) Foreign Application Priority Data
Apr. 24, 2007 (KR) .................. 10-2007-0040010

(51) Int. Cl.
*H01M 2/16* (2006.01)
*H01M 2/14* (2006.01)

(52) U.S. Cl.
USPC ................... 429/144; 429/129; 429/131

(58) Field of Classification Search
USPC ................................. 429/129–144
See application file for complete search history.

(56) References Cited

U.S. PATENT DOCUMENTS

| 4,540,640 A | 9/1985 | Iacovangelo et al. |
| 4,615,913 A | 10/1986 | Jones et al. |

(Continued)

FOREIGN PATENT DOCUMENTS

| CN | 1259773 A | 7/2000 |
| CN | 1388993 A | 1/2003 |

(Continued)

OTHER PUBLICATIONS

US Office Action for U.S. Appl. No. 11/217,918 dated Oct. 12, 2011.

(Continued)

*Primary Examiner* — Karie O'Neill Apicella
(74) *Attorney, Agent, or Firm* — Birch, Stewart, Kolasch & Birch, LLP

(57) ABSTRACT

An electrochemical device includes a plurality of unit cells, each having a first separator and a cathode and an anode positioned at both sides of the first separator, and a continuous single second separator interposed between adjacent unit cells in correspondence with each other in a laminated pattern and arranged to surround each unit cell. The first separator includes a heat-resisting porous substrate having a melt point of 200° C. or above and a first porous coating layer formed on at least one surface of the heat-resisting porous substrate and made of a mixture of a plurality of inorganic particles and a binder polymer. The second separator includes a polyolefin porous substrate and a second porous coating layer formed on at least one surface of the polyolefin porous substrate and made of a mixture of a plurality of inorganic particles and a binder polymer.

16 Claims, 4 Drawing Sheets

(56) References Cited

U.S. PATENT DOCUMENTS

| | | | |
|---|---|---|---|
| 4,637,990 A | 1/1987 | Torobin | |
| 5,336,573 A | 8/1994 | Zuckerbrod et al. | |
| 5,654,114 A | 8/1997 | Kubota et al. | |
| 5,695,873 A | 12/1997 | Kumar et al. | |
| 5,858,264 A | 1/1999 | Ichino et al. | |
| 5,882,721 A | 3/1999 | Delnick | |
| 6,261,721 B1 | 7/2001 | Andrieu et al. | |
| 6,270,928 B1 | 8/2001 | Andrieu et al. | |
| 6,277,514 B1 | 8/2001 | Ying et al. | |
| 6,281,257 B1 | 8/2001 | Ma et al. | |
| 6,299,653 B1 | 10/2001 | Hoshi et al. | |
| 6,328,770 B1 | 12/2001 | Gozdz | |
| 6,387,564 B1 | 5/2002 | Yamashita et al. | |
| 6,416,905 B1 | 7/2002 | Bronstert et al. | |
| 6,432,586 B1 | 8/2002 | Zhang | |
| 6,676,713 B1 | 1/2004 | Okada et al. | |
| 6,726,733 B2* | 4/2004 | Lee et al. | 29/623.3 |
| 7,211,352 B2 | 5/2007 | Lee et al. | |
| 7,662,517 B2 | 2/2010 | Lee et al. | |
| 7,682,740 B2 | 3/2010 | Yong et al. | |
| 7,704,641 B2 | 4/2010 | Yong et al. | |
| 2001/0005560 A1 | 6/2001 | Yoshida et al. | |
| 2001/0036573 A1 | 11/2001 | Jen et al. | |
| 2002/0045091 A1* | 4/2002 | Kamei et al. | 429/62 |
| 2002/0102455 A1 | 8/2002 | Daroux et al. | |
| 2002/0119374 A1 | 8/2002 | Yang et al. | |
| 2002/0132169 A1 | 9/2002 | Yamamoto et al. | |
| 2002/0187401 A1 | 12/2002 | Lee et al. | |
| 2003/0017386 A1 | 1/2003 | Daido et al. | |
| 2003/0044684 A1 | 3/2003 | Nanamoto et al. | |
| 2003/0104273 A1 | 6/2003 | Lee et al. | |
| 2003/0157409 A1 | 8/2003 | Huang | |
| 2003/0180623 A1 | 9/2003 | Yun et al. | |
| 2004/0023117 A1 | 2/2004 | Imachi et al. | |
| 2004/0106037 A1 | 6/2004 | Cho et al. | |
| 2004/0146778 A1 | 7/2004 | Lee et al. | |
| 2004/0214089 A1 | 10/2004 | Lee et al. | |
| 2005/0266150 A1* | 12/2005 | Yong et al. | 427/58 |
| 2006/0008700 A1 | 1/2006 | Yong et al. | |
| 2006/0234117 A1 | 10/2006 | Fujikawa et al. | |
| 2007/0122715 A1 | 5/2007 | Fujino et al. | |
| 2007/0184350 A1 | 8/2007 | Kim et al. | |
| 2009/0111025 A1 | 4/2009 | Lee et al. | |
| 2009/0305141 A1 | 12/2009 | Lee et al. | |
| 2011/0064988 A1 | 3/2011 | Yu | |
| 2011/0255211 A1 | 10/2011 | Koh et al. | |

FOREIGN PATENT DOCUMENTS

| | | |
|---|---|---|
| EP | 0814520 A2 | 12/1997 |
| EP | 1049188 B1 | 9/2002 |
| JP | 55-165572 A | 12/1980 |
| JP | 1981-32674 A | 4/1981 |
| JP | 05-314995 A | 11/1993 |
| JP | 10-334877 A | 12/1998 |
| JP | 11-080395 A | 3/1999 |
| JP | 2001-185114 A | 7/2001 |
| JP | 2001-319634 A | 11/2001 |
| JP | 2002-008724 A | 1/2002 |
| JP | 2002-151044 A | 5/2002 |
| JP | 2002-529891 A | 9/2002 |
| JP | 2003-059480 A | 2/2003 |
| JP | 2004-519824 A | 7/2004 |
| JP | 2004-227972 A | 8/2004 |
| JP | 2005-276503 A | 10/2005 |
| JP | 2005-327680 A | 11/2005 |
| JP | 2007-531234 A | 11/2007 |
| KR | 10-1988-0011946 A | 10/1988 |
| KR | 10-2000-0059999 A | 10/2000 |
| KR | 10-2000-0061755 A | 10/2000 |
| KR | 10-2001-0080496 A | 8/2001 |
| KR | 10-2001-0091048 A | 10/2001 |
| KR | 10-2001-0095623 A | 11/2001 |
| KR | 10-2002-0006387 A | 1/2002 |
| KR | 10-2002-0070882 A | 9/2002 |
| KR | 10-2002-0078660 A | 10/2002 |
| KR | 10-2003-0007659 A | 1/2003 |
| KR | 10-2003-0036966 A | 5/2003 |
| KR | 10-2003-0065074 A | 8/2003 |
| KR | 10-2003-0079326 A | 10/2003 |
| KR | 10-2003-0089750 A | 11/2003 |
| KR | 10-2004-0005550 A | 1/2004 |
| KR | 10-2004-0015999 A | 2/2004 |
| KR | 10-2005-0038254 A | 4/2005 |
| KR | 10-2005-0066652 | 6/2005 |
| KR | 10-2006-0021222 A | 3/2006 |
| KR | 10-2006-0072065 | 6/2006 |
| KR | 10-2007-0000231 | 1/2007 |
| RU | 2218634 C2 | 12/2003 |
| WO | 98/38688 A1 | 9/1998 |
| WO | 00/31812 A1 | 6/2000 |
| WO | 00/038263 A1 | 6/2000 |
| WO | 02/015299 A1 | 2/2002 |
| WO | 02/092638 A1 | 11/2002 |
| WO | 2004/021477 A1 | 3/2004 |
| WO | 2005/067080 A1 | 7/2005 |
| WO | 2005/076388 A1 | 8/2005 |
| WO | 2006004366 A1 | 1/2006 |
| WO | 2006/062349 A1 | 6/2006 |
| WO | 2006/068428 A1 | 6/2006 |
| WO | 2007021083 A1 | 2/2007 |

OTHER PUBLICATIONS

US Office Action for U.S. Appl. No. 13/184,288 dated Jan. 25, 2012.

Abraham, K.M. et al., "Inorganic-Organic Composite Solid Polymer Electrolytes," J. of the Electrochemical Society, 2000; 147(4): 1251-1256.

Augustin, S. et al., "Ceramic but flexible: new ceramic membrane foils for fuel cells and batteries," Desalination, 2002; 146: 23-28.

Chung, S.H. et al., "Enhancement of ion transport in polymer electrolytes by addition of nanoscale inorganic oxides," Journal of Power Sources, 2001; vol. 97-98: 644-648.

Hayashi et al., "Ionic conductivities of hybrid inorganic sulfide-polyether electrolytes," Electrochimica Acta, 2003, vol. 48 (14): 2003-2008.

Hikmet, R. A.M., "New lithium-ion polymer battery concept for increased capacity", J. of Power Sources, 2001, vol. 92: 212-220.

Inada, T. et al., "Fabrications and properties of composite solid-state electrolytes", Solid State Ionics, 2003, 158 (3-4): 275-280.

Li, Q. et al., "Four volts class solid lithium polymer batteries with a composite polymer electrolyte," Journal of Power Sources, 2002; 110 (1): 38-45.

Park, C.H. et al., "Electrochemical stability and conductivity enhancement of composite polymer electrolytes," Solid State Ionics, 2003; 159 (1): 111-119.

Prosini, P.P. et al., "A novel intrinsically porus separator for self-standing lithium-ion batteries," Electrochimica Acta, 2002, vol. 48(3): 227-233.

Zhang, X.W. et al., "Characteristics of lithium-ion-conducting composite polymer-glass secondary cell electrolytes," J. of Power Sources, 2002, vol. 112 (1): 209-215.

Solubility Parameter Table, source: (http://en.wikipedia.org/wiki/Hildebrand_solubility_parameter), U.S. Appl. No. 11/175,881 on Oct. 2009.

Chinese Office Action dated Jul. 3, 2009 for Application No. 200580027284.2.

Japanese Office Action mailed Apr. 2, 2010, citing all relevant JP Publications.

Letter (in English) dated Mar. 25, 2010 describing content of Official Notice dated Mar. 2, 2010 from the Japanese Patent Office.

Korean Office Action for Application No. 1020050126878 dated Apr. 30, 2007.

Korean International Search Report for PCT/KR20051000358 dated May 24, 2005.

Korean International Search Report for PCT/KR20051002133 dated Oct. 18, 2005.

Korean International Search Report for PCT/KR20051004450 dated Apr. 7, 2006.

(56) References Cited

OTHER PUBLICATIONS

Russian Office Action for PCT/KR20051002133 dated Jan. 21, 2008.
Taiwanese Office Action for Application No. 94128057 dated Oct. 1, 2007 (in English).
Office Action issued for U.S. Appl. No. 11/051,610 dated Nov. 28, 2008.
Final Office Action issued for U.S. Appl. No. 11/051,610 dated Jun. 29, 2009.
Office Action issued for U.S. Appl. No. 11/175,881 dated Jul. 1, 2009.
Office Action issued for U.S. Appl. No. 11/721,259 dated Feb. 24, 2009.
Office Action for U.S. Appl. No. 11/217,918 dated Apr. 2, 2009.
Office Action for U.S. Appl. No. 11/217,918 dated Oct. 8, 2009.
Final Office Action for U.S. Appl. No. 11/217,918 dated Mar. 31, 2010.
Office Action for U.S. Appl. No. 11/217,918 dated Aug. 20, 2010.
Final Office Action for U.S. Appl. No. 11/217,918 dated Apr. 14, 2011.
Office Action for U.S. Appl. No. 12/094,578 dated May 2, 2011.
Final Office Action for U.S. Appl. No. 12/094,578 dated Sep. 14, 2011.
Korean International Search Report for PCT/KR20061005221 dated Mar. 12, 2007.
Written Opinion PCT/KR20061005221 dated Mar. 12, 2007.
Korean International Search Report for PCT/KR20051002674 mailed Nov. 28, 2005.
Presentation of Information (in Japanese) cited in Official Notice from Japanese Patent Office dated Mar. 2, 2010.
PCT Written Opinion for PCT/KR2005-004450 dated Apr. 7, 2006.

\* cited by examiner

ELECTROCHEMICAL DEVICE HAVING DIFFERENT KINDS OF SEPARATORS

TECHNICAL FIELD

The present invention relates to an electrochemical device such as a lithium secondary battery, and more particularly to an electrochemical device having different kinds of separators.

BACKGROUND ART

Recently, there has been an increasing interest in energy storage technology. Batteries have been widely used as energy sources in the fields of cellular phones, camcorders, notebook computers, PCs and electric cars, resulting in intensive research and development into them. In this regard, electrochemical devices are one of the subjects of great interest. Particularly, development of rechargeable secondary batteries has been the focus of attention.

Among currently used secondary batteries, lithium secondary batteries developed in early 1990's have a higher drive voltage and a much higher energy density than those of conventional batteries using a liquid electrolyte solution such as Ni-MH batteries, Ni—Cd batteries, and $H_2SO_4$—Pb batteries. For these reasons, the lithium secondary batteries have been advantageously used. However, such a lithium secondary battery has disadvantages in that organic electrolytes used therein may cause safety-related problems such as ignition and explosion of the batteries and that processes for manufacturing such a battery are complicated. Recently, lithium-ion polymer batteries have been considered as one of the next-generation batteries since the above disadvantages of the lithium ion batteries are solved. However, the lithium-ion polymer batteries have a relatively lower battery capacity than those of the lithium ion batteries and an insufficient discharging capacity at low temperature, and therefore these disadvantages of the lithium-ion polymer batteries remain to be urgently solved.

Such electrochemical devices have been produced from many companies, and the battery stability has different phases in the electrochemical devices. Accordingly, it is important to ensure the stability of the electrochemical batteries. First of all, it should be considered that errors in operation of the electrochemical device should not cause damage to users. For this purpose, the Safety Regulation strictly regulates ignition and explosion in the electrochemical devices. In the stability characteristics of the electrochemical device, overheating of the electrochemical device may cause thermal runaway, and explosion may occur when a separator is pierced. In particular, a polyolefin porous substrate commonly used as a separator of an electrochemical device shows extreme thermal shrinking behavior at a temperature of 100° C. or above due to the features of its material and its manufacturing process such as elongation, so there may occur an electric short circuit between cathode and anode.

In order to solve the above safety-related problems of the electrochemical device, Korean Laid-open Patent Publication No. 10-2006-72065 and No. 10-2007-231 disclose a separator having a porous coating layer formed by coating at least one surface of a porous substrate having many pores with a mixture of inorganic particles and a binder polymer. In the above separator, the inorganic particles in the porous coating layer formed on the porous substrate act as a kind of spacer that keeps a physical shape of the porous coating layer, so the inorganic particles restrain thermal shrinkage of the porous substrate when the electrochemical device is overheated and solve the electric short circuit problem between the cathode and the anode. In addition, interstitial volumes exist among the inorganic particles, thereby forming fine pores.

As mentioned above, the porous coating layer formed on the porous substrate attributes to the improvement of safety. In other words, in case a temperature rapidly increases due to excessive overcharging, the polyolefin porous substrate (commonly with a melt point in the range from 100 to 160° C.) having the porous coating layer attributes to the safety of a battery since pores are closed in advance. However, if the temperature of the battery increases higher, the polyolefin porous substrate may be completely melted, which may cause explosion or ignition of the battery. In addition, though the porous substrate is made of a heat-resisting material with a higher melt point than the polyolefin substrate, at excessive overcharging, temperature may rapidly increase to melt the heat-resisting substrate completely, which may cause explosion or ignition of the battery.

Meanwhile, Korean Laid-open Patent Publication No. 10-2005-66652 discloses a structure of a lithium secondary battery having different kinds of separators. In this document, a lithium ion secondary battery is an electrochemical device, which includes a plurality of unit cells, each having a first separator and a cathode and an anode positioned at both sides of the first separator; and a continuous single second separator interposed between adjacent unit cells in correspondence with each other in a laminated pattern and arranged to surround each unit cell. Here, the first and second separators adopt porous substrates made of materials with different melt points. According to this technique, though the first separator having a lower melt point is thermally shrunken, the second separator having a higher melt point is hardly thermally shrunken, thereby preventing an internal short circuit. However, the lithium secondary battery mentioned above cannot prevent a short circuit occurring in a unit cell due to thermal shrinkage of the first separator. In addition, in case temperature increases so high to cause thermal shrinkage of the second separator according to excessive overcharging, the battery may be exploded or ignited.

DISCLOSURE OF INVENTION

Technical Problem

The present invention is designed to solve the problems of the prior art, and therefore an object of the invention is to provide an electrochemical device having different kinds of separators, which may firstly solve a short circuit problem between a cathode and an anode by restraining thermal shrinkage of a porous substrate of the separators and preventing a contact between the cathode and the anode, and secondarily prevent explosion or ignition of the electrochemical device by reducing a temperature increasing rate even when a rapid temperature increase occurs due to excessive overcharging.

Technical Solution

In order to accomplish the first object, the present invention provides an electrochemical device, including a plurality of unit cells, each having a first separator and a cathode and an anode positioned at both sides of the first separator; and a continuous single second separator interposed between adjacent unit cells in correspondence with each other in a laminated pattern and arranged to surround each unit cell, wherein the first separator includes a heat-resisting porous substrate having a melt point of 200° C. or above and a first porous coating layer formed on at least one surface of the heat-resisting porous substrate and made of a mixture of a plurality of inorganic particles and a binder polymer, and wherein the second separator includes a polyolefin porous substrate and a second porous coating layer formed on at least one surface of the polyolefin porous substrate and made of a mixture of a plurality of inorganic particles and a binder polymer.

The electrochemical device of the present invention uses the first and second separators having different kinds of porous coating layers, so it may restrain thermal shrinkage of the porous substrates of the separators even at overheating of the electrochemical and also solve a short circuit problem between a cathode and an anode by preventing a contact between the cathode and the anode. In addition, even when a rapid temperature increase occurs due to an excessive overcharging, pores of the polyolefin porous substrate of the second separator are closed to intercept an electric current, so a temperature increasing rate is reduced, which ensures thermal stability of the second separator and thus results in prevention of ignition or explosion of the electrochemical device.

In the electrochemical device according to the present invention, the heat-resisting porous substrate may be formed using any one material or a mixture of at least two materials selected from the group consisting of polyester, polyacetal, polyamide, polycarbonate, polyimde, polyetheretherketone, polyethersulfone, polyphenylenesulfidro, polyethylenenaphthalene and polyphenyleneoxide, and the polyolefin porous substrate preferably has a melt point ranging from 130 to 160° C.

BRIEF DESCRIPTION OF THE DRAWINGS

These and other features, aspects, and advantages of preferred embodiments of the present invention will be more fully described in the following detailed description, taken accompanying drawings. In the drawings.

BEST MODE

Hereinafter, preferred embodiments of the present invention will be described in detail referring to the accompanying drawings. Prior to the description, it should be understood that the terms used in the specification and appended claims should not be construed as limited to general and dictionary meanings, but interpreted based on the meanings and concepts corresponding to technical aspects of the present invention on the basis of the principle that the inventor is allowed to define terms appropriately for the best explanation.

An electrochemical device according to the present invention includes a plurality of unit cells, each having a first separator and a cathode and an anode positioned at both sides of the first separator; and a continuous single second separator interposed between adjacent unit cells in correspondence with each other in a laminated pattern and arranged to surround each unit cell, wherein the first separator includes a heat-resisting porous substrate having a melt point of 200° C. or above and a first porous coating layer formed on at least one surface of the heat-resisting porous substrate and made of a mixture of a plurality of inorganic particles and a binder polymer, and wherein the second separator includes a polyolefin porous substrate and a second porous coating layer formed on at least one surface of the polyolefin porous substrate and made of a mixture of a plurality of inorganic particles and a binder polymer.

Figure 1:
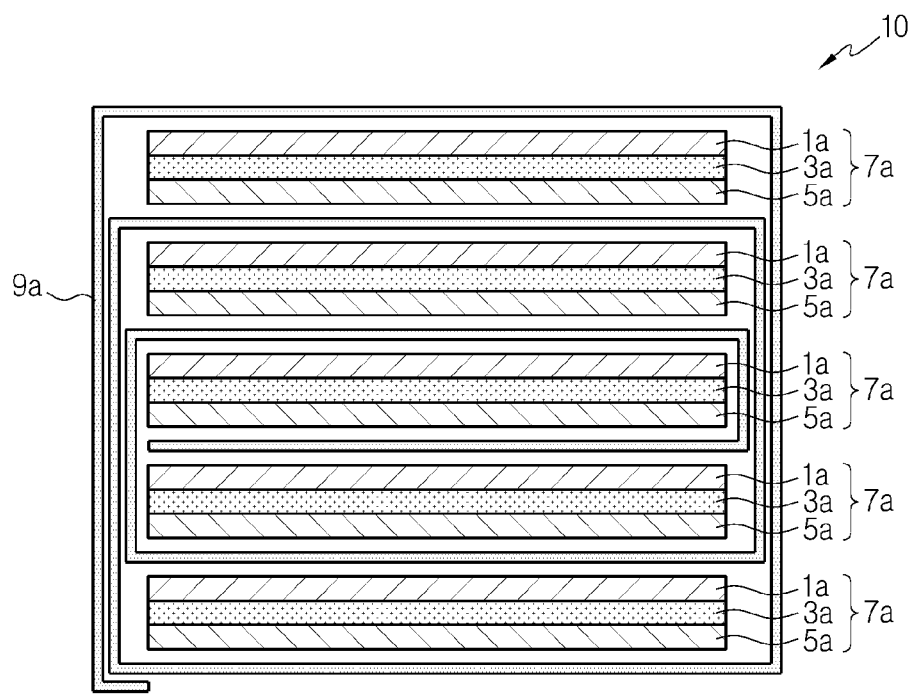
FIG. 1 is a schematic sectional view showing an electrode assembly according to one embodiment of the present invention.
Figure 2:
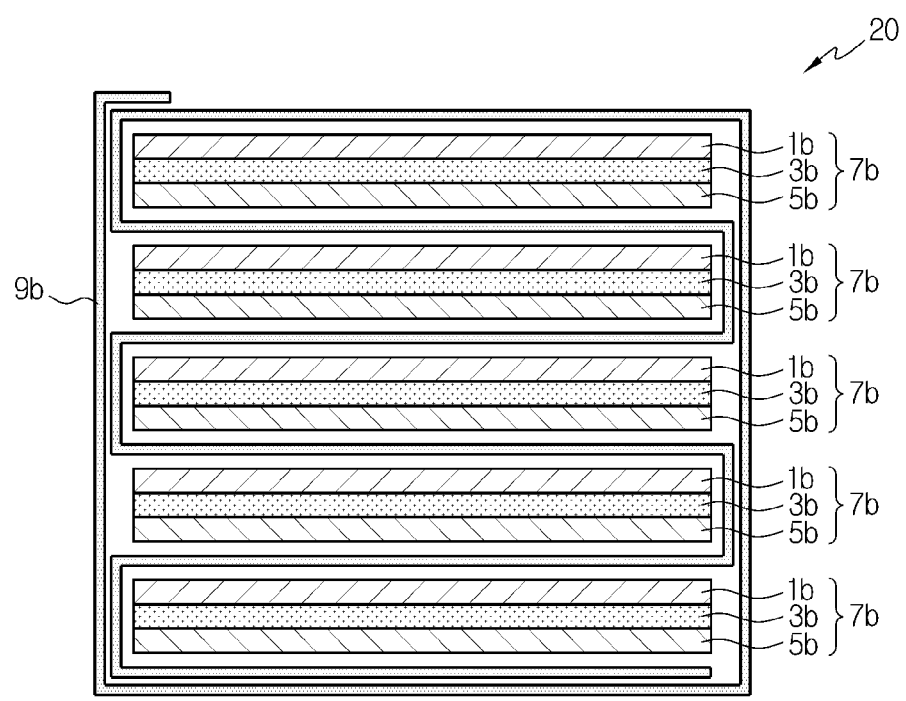
FIG. 2 is a schematic sectional view showing an electrode assembly according to another embodiment of the present invention.
Figure 3:
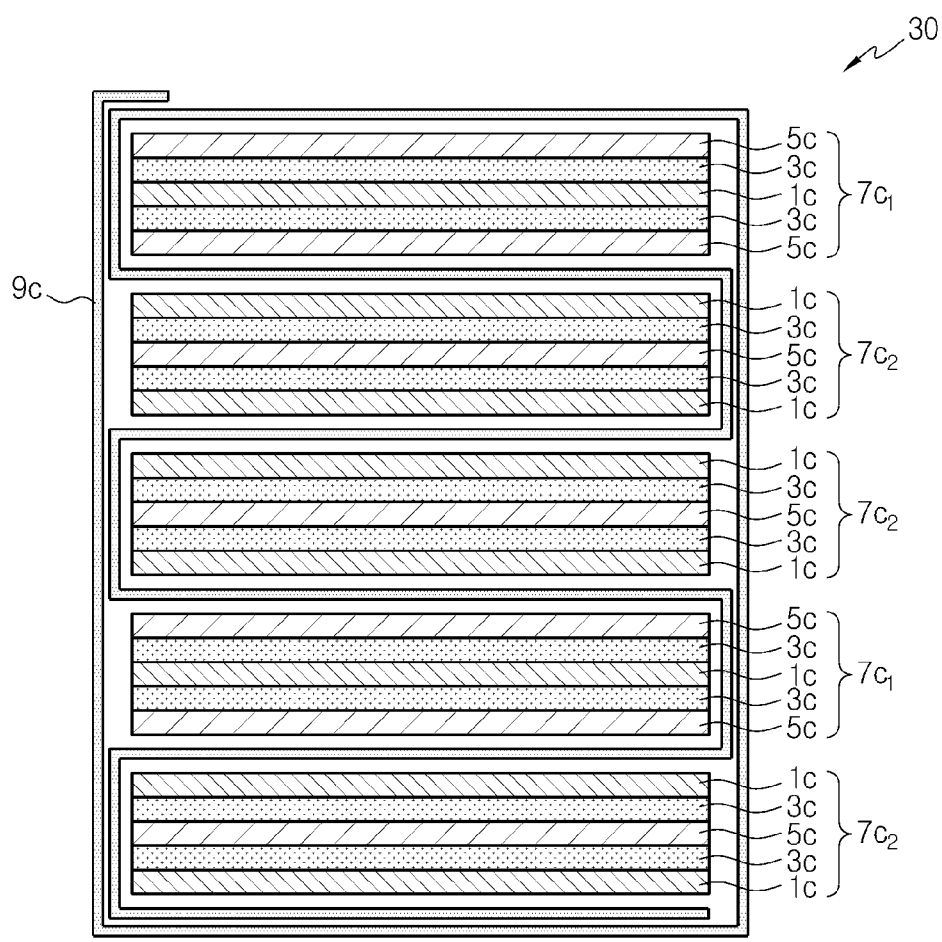
FIG. 3 is a schematic sectional view showing an electrode assembly according to still another embodiment of the present invention.

FIGS. 1 to 3 are sectional views schematically showing preferable electrode assemblies provided to the electrochemical device of the present invention. In the drawings, the same reference numeral indicates the same component.

Referring to FIGS. 1 to 3, an electrode assembly 10, 20, 30 includes a plurality of unit cells 7a, 7b, 7c1, 7c2, each having a first separator 3a, 3b, 3c and an anode 1a, 1b, 1c and a cathode 5a, 5b, 5c positioned at both sides of the first separator 3a, 3b, 3c. The cathode 5a, 5b, 5c is configured such that cathode active material layers are formed on both surfaces of a cathode current collector, and the anode 1a, 1b, 1c is configured such that anode active material layers are formed on both surfaces of an anode current collector. As shown in FIGS. 1 to 3, the unit cell may be configured with various structures such as a full cell 7a, 7b in which one cathode 5a, 5b and one anode 1a, 1b are positioned on both sides of a first separator 3a, 3b, or a bi-cell 7c1, 7c2 in which first separators 3c are respectively positioned on both surfaces of a cathode 5c or a anode 1c, and an anode 1c or a cathode 5c is respectively positioned on each first separator 3c.

In the electrode assembly 10, 20, 30, each unit cell 7a, 7b, 7c1, 7c2 is present in a laminated pattern. At this time, between the unit cells 7a, 7b, 7c1, 7c2 adjacent to each other, a continuous single second separator 9a, 9b, 9c arranged to surround each unit cell 7a, 7b, 7c1, 7c2 is interposed in various patterns as shown in FIGS. 1 to 3, thereby playing a role of separator between the unit cells 7a, 7b, 7c1, 7c2.

Figure 4:
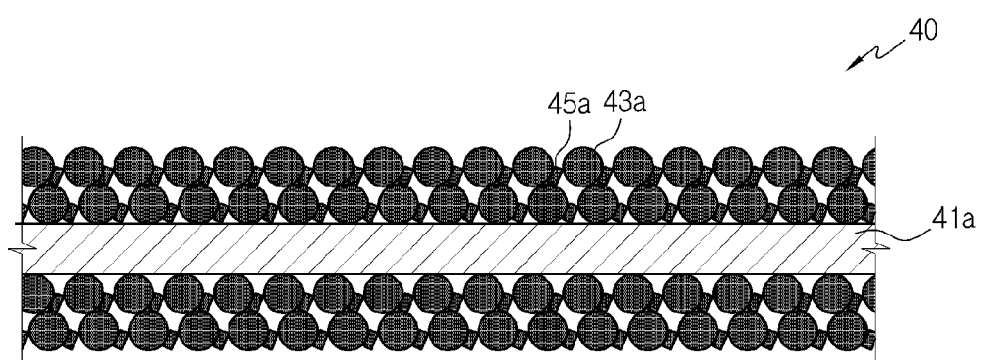
FIG. 4 is a schematic diagram showing a first separator used for an electrode assembly of the present invention.
Figure 5:
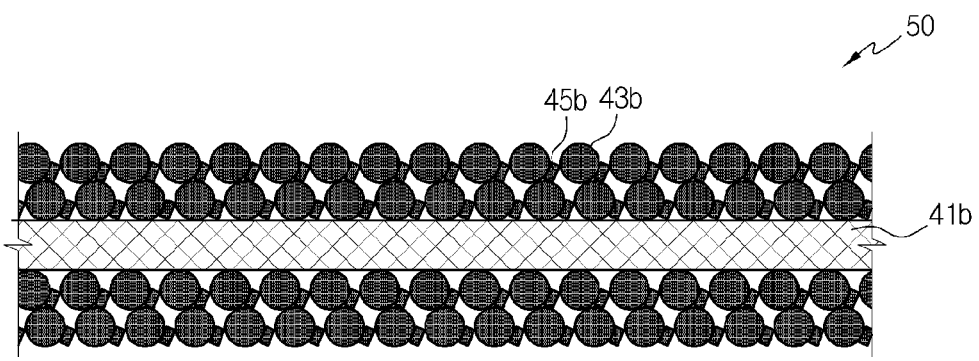
FIG. 5 is a schematic diagram showing a second separator used for an electrode assembly of the present invention.

The first separator 3a, 3b, 3c and the second separator 9a, 9b, 9c of FIGS. 1 to 3 are all configured such that a porous coating layer is formed on at least one surface of a porous substrate, but the kinds of porous substrates are different from each other. That is to say, as shown in FIG. 4, a first separator 40 includes a heat-resisting porous substrate 41a having a melt point of 200° C. or above and a first porous coating layer formed on at least one surface of the heat-resisting porous substrate 41a and made of a mixture of a plurality of inorganic particles 43a and a binder polymer 45a. In addition, as shown in FIG. 5, a second separator 50 includes a polyolefin porous substrate 41b and a second porous coating layer formed on at least one surface of the polyolefin porous substrate 41b and made of a mixture of a plurality of inorganic particles 43b and a binder polymer 45b.

The inorganic particles in the porous coating layers formed on one or both surfaces of the first and second separators act as a kind of spacer that allow keeping a physical shape of the porous coating layer, thereby restraining thermal shrinkage of the porous substrate when the electrochemical device is overheated, and also preventing a contact between the cathode and the anode even when the porous substrate is melted. Accordingly, the first and second separators having the porous coating layer attribute to improving safety of the electrochemical device.

In addition, in case a rapid temperature increase occurs in the electrochemical device due to excessive overcharging, pores in the polyolefin porous substrate of the second separator are firstly closed to intercept an electric current primarily. Thus, though the polyolefin porous substrate is completely melted due to a high temperature, it is possible to reduce a temperature increasing rate. As mentioned above, if a temperature increasing rate is reduced by means of the second separator, the porous substrate of the first separator, which is made of a heat-resisting porous substrate with a greatly higher melt point (200° C. or above) than the second separator having the polyolefin porous substrate, may endure a higher temperature to some extent. In addition, the porous coating layer formed on the first separator further improves safety, so it is possible to prevent ignition or explosion of the electrochemical device.

In the electrochemical device of the present invention, the heat-resisting porous substrate may adopt any kind of material that has a melt point of 200° C. or above and is useable as a separator of an electrochemical device. For example, the heat-resisting porous substrate may be formed using one material or a mixture of at least two materials selected from the group consisting of polyester, polyacetal, polyamide, polycarbonate, polyimide, polyetheretherketone, polyethersulfone, polyphenylenesulfidro, polyethylenenaphthalene and polyphenyleneoxide. The above heat-resisting porous substrate may have any thickness, pore size and porosity, not limitedly. However, the heat-resisting porous substrate preferably has a thickness ranging from 1 to 100 μm (more preferably from 5 to 50 μm), a pore size ranging from 0.01 to 50 μm (more preferably from 0.1 to 20 μm), and a porosity ranging from 5 to 95%.

The polyolefin porous substrate may adopt any kind of polyolefin porous substrate commonly used for an electrochemical device, particularly for a lithium secondary battery, which may be a non-woven fabric or a membrane formed using polyethylene such as HDPE (high density polyethylene), LLDPE (linear low density polyethylene, LDPE (low density polyethylene) and UHMWPE (ultra high molecular weight polyethylene), polypropylene, or their derivates, preferably having a melt point ranging from 130 to 160° C. The above polyolefin porous substrate may have any thickness, pore size and porosity, not limitedly. However, the polyolefin porous substrate preferably has a thickness ranging from 1 to 100 μm (more preferably from 2 to 30 μm), a pore size ranging from 0.1 to 50 μm, and a porosity ranging from 10 to 95%.

In the electrochemical device according to the present invention, the inorganic particle used for forming the first and second porous coating layers may adopt any inorganic particle commonly used in the art, namely an inorganic particle that does not cause oxidation or reduction reaction in an operating voltage range (for example, 0 to 5V based on Li/Li$^+$) of an electrochemical device. In particular, in case an inorganic particle with ion transferring capability is used, it is possible to enhance the performance of the electrochemical device by increasing ion conductivity. In addition, in case an inorganic particle with a high dielectric constant is used, it contributes to the increase of dissociation of electrolyte salt, for example lithium salt, in the liquid electrolyte, thereby improving ion conductivity of the electrolyte.

Due to the above reasons, it is preferred that the inorganic particles may include inorganic particles having a dielectric constant of 5 or above, preferably 10 or above, inorganic particles having lithium-ion transferring capability, or their mixtures. The inorganic particle having a dielectric constant of 5 or above may be for example $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC, $TiO_2$, and their mixtures, but not limitedly.

In particular, the inorganic particles such as of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT) and hafnia ($HfO_2$) show a high dielectric constant of 100 or above and have piezoelectricity since charges are generated to make a potential difference between both surfaces when a certain pressure is applied thereto to extend or shrink them, so the above inorganic particles may prevent generation of an internal short circuit of both electrodes caused by an external impact and thus further improve the safety of the electrochemical device. In addition, in case the inorganic particles having a high dielectric constant are mixed with the inorganic particles having lithium ion transferring capability, their synergistic effect may be doubled.

In the present invention, the inorganic particle having lithium ion transferring capability means an inorganic particle containing lithium atom and having a function of moving a lithium ion without storing the lithium. The inorganic particle having lithium ion transferring capability may transfer and move lithium ions due to a kind of defect existing in the particle structure, so it is possible to improve lithium ion conductivity in the battery and also improve the performance of the battery. The inorganic particle having lithium ion transferring capability may be lithium phosphate ($Li_3PO_4$), lithium titanium phosphate ($Li_xTi_y(PO_4)_3$, 0<x<2, 0<y<3), lithium aluminum titanium phosphate ($Li_xAl_yTi_z(PO_4)_3$, 0<x<2, 0<y<1, 0<z<3), (LiAlTiP)$_xO_y$ type glass (0<x<4, 0<y<13) such as $14Li_2O-9Al_2O_3-38TiO_2-39P_2O_5$, lithium lanthanum titanate ($Li_xLa_yTiO_3$, 0<x<2, 0<y<3), lithium germanium thiophosphate ($Li_xGe_yP_zS_w$, 0<x<4, 0<y<1, 0<z<1, 0<w<5) such as $Li_{3.25}Ge_{0.25}P_{0.75}S_4$, lithium nitrides ($Li_xN_y$, 0<x<4, 0<y<2) such as $Li_3N$, $SiS_2$ type glass ($Li_xSi_yS_z$, 0<x<3, 0<y<2, 0<z<4) such as $Li_3PO_4$—$Li_2S$—$SiS_2$, $P_2S_5$ type glass ($Li_xP_yS_z$, 0<x<3, 0<y<3, 0<z<7) such as LiI—$Li_2S$—$P_2S_5$, and their mixtures, but not limitedly.

In the electrochemical device according to the present invention, the size of inorganic particles in the porous coating layer respectively formed on the first and second separators is not specially limited, but it preferably ranges from 0.001 to 10 μm in order to form a coating layer with a uniform thickness and ensure suitable porosity. If the particle size is less than 0.001 μm, a dispersing property of inorganic particles may be deteriorated. If the particle size exceeds 10 μm, the thickness of the porous coating layer is increased, which may deteriorate mechanical properties. Also, an excessively great pore size may increase the possibility of internal short circuit while a battery is charged or discharged.

A ratio of the inorganic particles to the binder polymer in the porous coating layer respectively formed on the first and second separators preferably ranges from 50:50 to 99:1, more preferably from 70:30 to 95:5. If the ratio of the organic particles to the binder polymer is less than 50:50, the content of polymer is so great that the thermal stability of the separator may not be much improved. In addition, pore size and porosity may be decreased due to the decrease of interstitial volume formed among the inorganic particles, thereby causing deterioration of the performance of a final battery. If the content of inorganic particles exceeds 99 parts by weight, the peeling resistance of the porous coating layer may be weakened since the content of binder polymer is so small. The thickness of the porous coating layer composed of the inorganic particles and the binder polymer is not specially limited but preferably in the range from 0.01 to 20 μm. Also, pore size and porosity are not specially limited, but the pore size preferably ranges from 0.001 to 10 μm and the porosity preferably ranges from 10 to 90%. The pore size and porosity are mainly dependent on the size of inorganic particles. For example, in case inorganic particles have a diameter of 1 µm or less, the formed pore is also approximately 1 µm or less. The pores as mentioned above are filled with electrolyte injected later, and the filled electrolyte plays a role of transferring ions. In case the pore size and porosity are respectively less than 0.001 µm and 10%, the porous coating layer may act as a resistance layer. In case the pore size and porosity are respectively greater than 10 µm and 90%, mechanical properties may be deteriorated.

In the separator according to the present invention, the binder polymer used for forming the porous coating layer may adopt any polymer commonly used for forming a porous coating layer in the art. In particular, a polymer having a glass transition temperature ($T_g$) ranging from −200 to 200° C. is preferred, since this polymer may improve mechanical properties such as flexibility and elasticity of the finally formed porous coating layer. This binder polymer sufficiently plays a binder role for connecting and stabilizing inorganic particles, thereby attributing to preventing deterioration of mechanical properties of the separator having the porous coating layer.

In addition, the ion transferring capability is not essential to the binder polymer, but a polymer having ion transferring capability may further improve the performance of an electrochemical device. Thus, the binder polymer preferably has as high dielectric constant as possible. In fact, a solubility parameter of salt in an electrolyte depends on a dielectric constant of an electrolyte solvent, so a polymer with a higher dielectric constant may improve the degree of dissociation further. Such a binder polymer preferably has a dielectric constant ranging from 1.0 to 100 (a measurement frequency is 1 kHz), particularly 10 or above.

In addition to the above functions, the binder polymer may exhibit a high degree of swelling for electrolyte since it gelates when being swelled in a liquid electrolyte. Accordingly, a polymer having a solubility parameter ranging from 15 to 45 $Mpa^{1/2}$ is preferred, and the solubility parameter more preferably ranges from 15 to 25 $Mpa^{1/2}$ and 30 to 45 $Mpa^{1/2}$. Thus, hydrophile polymer having many polar groups is preferred rather than hydrophobic polymer such as polyolefin. If the solubility parameter is less than 15 $Mpa^{1/2}$ or greater than 45 $Mpa^{1/2}$, the polymer may not easily swelled in a common liquid electrolyte for batteries.

Such polymer may be polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxylmethyl cellulose and so on.

In the separator of the present invention, other additives may be further included as components of the porous coating layer in addition to the electrode active particles, the inorganic particles and the binder polymer.

The separator having a porous coating layer with electrode active particles according to the present invention may be manufactured in a common way, and a preferable example is explained below, but the present invention is not limited thereto.

First, a binder polymer solution is made in a way of dissolving a binder polymer in a solvent.

Subsequently, inorganic particles are added to the binder polymer solution and dispersed therein. The solvent preferably has a solubility parameter similar to that of the used binder polymer and a low boiling point. It will help uniform mixture and easy removal of the solvent afterward. A non-limiting example of usable solvent includes acetone, tetrahydrofuran, methylene chloride, chloroform, dimethylformamide, N-methyl-2-pyrrolidone (NMP), cyclohexane, water and their mixtures. It is preferred that the inorganic particles are pulverized after being added to the binder polymer solution. At this time, the time required for pulverization is suitably 1 to 20 hours, and the particle size of the pulverized particles preferably ranges from 0.001 and 10 µm, as mentioned above. Conventional pulverization methods may be used, and a method using a ball mill is particularly preferred.

After that, a porous substrate is coated with the binder polymer solution in which the inorganic particles are dispersed, under the humidity condition of 10 to 80%, and then dried.

In order to coat the porous substrate with the binder polymer solution in which the inorganic particles are dispersed, a common coating method well known in the art may be used. For example, various methods such as dip coating, die coating, roll coating, comma coating or their combinations may be used.

After preparing the first and second separators according to the present invention as mentioned above, the first separator is interposed between a cathode and an anode and thus laminated with the electrodes to make a unit cell, and the second separator is arranged to surround unit cells in an aforementioned pattern to manufacture an electrode assembly of an electrochemical device. At this time, in case a polymer that is gellable at swelling in liquid electrolyte is used as a binder polymer component, after a battery is assembled, the injected electrolyte and the binder polymer may be reacted and then gelated, thereby forming a gel-type composite electrolyte.

The electrochemical device may be any device in which electrochemical reactions may occur, and a specific example of the electrochemical devices includes all kinds of primary batteries, secondary batteries, fuel cells, solar cells or capacitors such as a super capacitor. In particular, among the secondary batteries, lithium secondary batteries including a lithium metal secondary battery, a lithium ion secondary battery, a lithium polymer secondary battery or a lithium ion polymer secondary battery are preferred.

There is no special limitation in the electrodes that may be used together with the separators of the present invention, and the electrodes may be manufactured by coating a current collector with an electrode active material slurry according to one of common methods well known in the art. A cathode active material and an anode active material used for the electrodes may adopt common electrode active materials useable in a cathode and an anode of a conventional electrochemical device. Particularly, among the electrode active materials, the cathode active material preferably uses lithium manganese oxides, lithium cobalt oxides, lithium nickel oxides, lithium iron oxides or lithium composite oxides thereof, not limitedly. Also, non-limiting examples of anode active materials are lithium intercalation materials such as lithium metal, lithium alloy, carbon, petroleum coke, activated carbon, graphite or other carbonaceous materials. Non-limiting examples of the cathode current collector include a foil made of aluminum, nickel or combinations thereof, and non-limiting examples of the anode current collector include a foil made of copper, gold, nickel, copper alloys or combinations thereof.

The electrolyte solution useable for the electrochemical device of the present invention includes a salt represented by the formula of $A^+B^-$, wherein $A^+$ represents an alkali metal cation such as $Li^+$, $Na^+$, $K^+$ and combinations thereof, and $B^-$ represents an salt containing an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ and combinations thereof. The salt may be dissolved or dissociated in an organic solvent composed of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), gamma-butyrolactone (γ-butyrolactone) and mixtures thereof. However, the electrolyte solution useable in the present invention is not limited to the above examples.

The electrolyte solution may be injected in a suitable step during the manufacturing process of a battery, according to the manufacturing process and desired properties of a final product. In other words, the electrolyte solution may be injected before a battery is assembled or during a final step of the assembly process of a battery.

MODE FOR INVENTION

Hereinafter, various preferred examples of the present invention will be described in detail for better understandings. However, the examples of the present invention may be modified in various ways, and they should not be interpreted as limiting the scope of the invention. The examples of the present invention are just for better understandings of the invention to persons having ordinary skill in the art.

Embodiment 1

Manufacture of First Separator

About 5 weight % of PVdF-CTFE (polyvinylidene fluoride-chlorotrifluoroethylene copolymer) was added to acetone and dissolved at 50° C. for about 12 hours to make a polymer solution. $Al_2O_3$ powder and $BaTiO_3$ powder at a weight ratio of 9:1 were added to the prepared polymer solution at a weight ratio of polymer/inorganic powder=20/80, and then the inorganic powder was pulverized into a size of 300 nm and dispersed for 12 hours or more by ball milling to make a slurry.

The prepared slurry was used for coating a polyethyleneterephthalate porous separator (having a porosity of 80%) having a thickness of 20 μm by means of dip coating, and a coating thickness was controlled to be about 2 μm. After the measurement using a porosimeter, a pore size in the porous coating layer formed on the polyethyleneterephthalate porous separator was in the level of 0.3 μm, and a porosity was in the level of 55%.

Manufacture of Second Separator

A second separator was prepared in the same way as the manufacture method of the first separator, except that PVdF-HFP (polyvinylidene fluoride-hexafluoropropylene copolymer) was used as a polymer, and a polyethylene porous film (with a porosity of 45%) with a thickness of 20 μm was used.

Preparation of Cathode 92 weight % of lithium cobalt composite oxide as a cathode active material, 4 weight % of carbon black as a conductive material and 4 weight % of PVdF as a coupling agent were added to N-methyl-2 pyrrolidone (NMP) as a solvent to make a cathode active material slurry. The cathode active material slurry was applied to an aluminum (Al) film that is a cathode current collector with a thickness of 20 μm, and then dried to make a cathode, and then roll pressing was conducted thereto.

Preparation of Anode 96 weight % of carbon powder as an anode active material, 3 weight % of polyvinylidene fluoride (PVdF) as a coupling agent and 1 weight % of carbon black as a conductive material were added to N-methyl-2 pyrrolidone (NMP) as a solvent to make an anode active material slurry. The anode active material slurry was applied to a copper (Cu) film that is an anode current collector with a thickness of 10 μm, and then dried to make an anode, and then roll pressing was conducted thereto.

Manufacture of Battery

Unit cells were assembled in a way of stacking the cathode, the anode and the first separator, prepared as above. After that, the unit cells were rolled using the second separator in a folding manner to make an electrode assembly configured as shown in FIG. 1. And then, an electrolyte (ethylenecarbonate (EC)/ethylmethylcarbonate (EMC)=1/2 (a volume ratio), 1 mol of lithiumhexafluorophosphate (LiPF6)) was injected to make a lithium secondary battery.

Comparative Example 1

A battery was manufactured in the same way as in the embodiment 1, except that the second separator having a polyethylene porous film was used as the first separator.

Comparative Example 2

A battery was manufactured in the same way as in the embodiment 1, except that the first separator having a polyethyleneterephthalate porous film was used as the second separator.

Hot Box Experiment

The lithium secondary batteries prepared by the embodiment and the comparative examples were left alone at 160° C. for 1 hour, and then the states of batteries were evaluated, as listed in the following table 1.

As a result of the experiment, ignition was observed in the battery of the comparative example 1, which was made using separators in which all porous substrates adopt a polyethylene porous film. It is because an internal short circuit occurs in the cathode and the anode due to melting of the polyethylene porous films, and thus the safety of the battery is deteriorated. On the contrary, the batteries of the embodiment 1 and the comparative example 2 were kept in a safe state without occurring ignition or combustion due to the first separator with excellent heat resistance.

TABLE 1

|  | Embodiment 1 | Comparative Example 1 | Comparative Example 2 |
| --- | --- | --- | --- |
| Ignition | No | Yes | No |

Overcharging Experiment

The batteries prepared by the embodiment and the comparative examples were charged under conditions of 6V/1 A, 10V/1 A and 12V/1 A, and after that, the states of batteries were evaluated, as listed in the following table 2.

As a result of the experiment, the battery of the comparative example 1, which was made using separators in which all porous substrates adopt a polyethylene porous film showed explosion at all charging conditions.

In addition, the battery of the comparative example 2, which was made using separators in which all porous substrates adopt a polyethyleneterephthalate porous film showed no explosion at the charging conditions of 6V/1 A and 10V/1 A, but it showed explosion at the overcharging condition of 12V/1 A.

Meanwhile, the battery according to the embodiment 1 of the present invention was found safe in all overcharging conditions. The battery of the embodiment 1 is considered to ensure better safety than the battery of the comparative example 1 due to the following reasons. In other words, in case a battery temperature is rapidly increased due to the overcharging condition of 12V/1 A, the pores of the polyolefin porous film of the second separator were closed at a temperature of 160° C. or below to intercept an electric current and thus reduce a temperature increasing rate, which accordingly reduces a range of following temperature increase and thus keeps the first separator with an excellent heat resistance in a safe state.

TABLE 2

| Charging Condition | Embodiment 1 | Comparative Example 1 | Comparative Example 2 |
|---|---|---|---|
| 6 V/1 A | No explosion | Explosion | No explosion |
| 10 V/1 A | No explosion | Explosion | No explosion |
| 12 V/1 A | No explosion | Explosion | Explosion |

INDUSTRIAL APPLICABILITY

As described above, the electrochemical device of the present invention uses first and second separators having different kinds of porous coating layers, so it may restrain thermal shrinkage of the porous substrates of the separators even at overheating of the electrochemical and also solve a short circuit problem between a cathode and an anode by preventing a contact between the cathode and the anode. In addition, even when a rapid temperature increase occurs due to an excessive overcharging, pores of the polyolefin porous substrate of the second separator are closed to intercept an electric current, so a temperature increasing rate is reduced, which ensures thermal stability of the second separator and thus results in prevention of ignition or explosion of the electrochemical device.

What is claimed is:

1. An electrochemical device, comprising:
a plurality of unit cells, each having a first separator and a cathode and an anode positioned at both sides of the first separator; and
a continuous single second separator interposed between adjacent unit cells in correspondence with each other in a laminated pattern and arranged to surround each unit cell,
wherein the first separator includes a heat-resisting porous substrate having a melt point of 200° C. or above and a first porous coating layer formed on at least one surface of the heat-resisting porous substrate and made of a mixture of a plurality of inorganic particles and a binder polymer, and
wherein the second separator includes a polyolefin porous substrate and a second porous coating layer formed on at least one surface of the polyolefin porous substrate and made of a mixture of a plurality of inorganic particles and a binder polymer.

2. The electrochemical device according to claim 1, wherein the heat-resisting porous substrate is formed using any one material or a mixture of at least two materials selected from the group consisting of polyester, polyacetal, polyamide, polycarbonate, polyimide, polyetheretherketone, polyethersulfone, polyphenylenesulfidro, polyethylenenaphthalene and polyphenyleneoxide.

3. The electrochemical device according to claim 1, wherein the heat-resisting porous substrate has a thickness ranging from 1 to 100 μm, a pore size ranging from 0.01 to 50 μm, and a porosity ranging from 5 to 95%.

4. The electrochemical device according to claim 1, wherein the polyolefin porous substrate is formed using any material selected from the group consisting of polyethylene, polypropylene and their mixtures.

5. The electrochemical device according to claim 1, wherein the polyolefin porous substrate has a melt point ranging from 130 to 160° C.

6. The electrochemical device according to claim 1, wherein the polyolefin porous substrate has a thickness ranging from 1 to 100 μm, a pore size ranging from 0.1 to 50 μm and a porosity ranging from 10 to 95%.

7. The electrochemical device according to claim 1, wherein the inorganic particles of the first and second porous coating layers have a diameter size ranging from 0.001 to 10 μm, independently.

8. The electrochemical device according to claim 1, wherein the inorganic particles of the first and second porous coating layers are selected from the group consisting of inorganic particles having a dielectric constant of 5 or above, inorganic particles having lithium-ion transferring capability, or their mixtures.

9. The electrochemical device according to claim 8, wherein the inorganic particle having a dielectric constant of 5 or above is an inorganic particle selected from the group consisting of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, MgO, NiO, CaO, ZnO, $ZrO_2$, $SiO_2$, $Y_2O_3$, $Al_2O_3$, SiC and $TiO_2$.

10. The electrochemical device according to claim 9, wherein the inorganic particle having a dielectric constant of 5 or above is an piezoelectric inorganic particle selected from the group consisting of $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT) and hafnia ($HfO_2$).

11. The electrochemical device according to claim 8, wherein the inorganic particle having lithium ion conductivity is an inorganic particle selected from the group consisting of lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_z(PO_4)_3$, $0<x<2$, $0<y<1$, $0<z<3$), $(LiAlTiP)_xO_y$ type glass ($0<x<4$, $0<y<13$), lithium lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitrides ($Li_xN_y$, $0<x<4$, $0<y<2$), $SiS_2$ type glass ($Li_xSi_yS_z$, $0<x<3$, $0<y<2$, $0<z<4$), and $P_2S_5$ type glass ($Li_xP_yS_z$, $0<x<3$, $0<y<3$, $0<z<7$).

12. The electrochemical device according to claim 1, wherein a weight ratio of the inorganic particles to the binder polymer in the first and second porous coating layers ranges from 50:50 to 99:1, independently.

13. The electrochemical device according to claim 1, wherein the binder polymer of the first and second porous coating layers has a solubility parameter ranging from 15 to 45 $Mpa^{1/2}$, independently.

14. The electrochemical device according to claim 13, wherein the binder polymer is any one material or a mixture of at least two materials selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-covinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose.

15. The electrochemical device according to claim 1, wherein the first and second porous coating layers have a thickness ranging from 0.01 to 20 μm, independently.

16. The electrochemical device according to claim 1, wherein the electrochemical device is a lithium secondary battery.

* * * * *